United States Patent
Fujimoto et al.

(10) Patent No.: US 8,330,326 B2
(45) Date of Patent: Dec. 11, 2012

(54) PIEZOELECTRIC MOTOR AND METHOD OF MANUFACTURING THE SAME

(75) Inventors: Katsumi Fujimoto, Moriyama (JP); Hiroshi Asano, Omihachiman (JP)

(73) Assignee: Murata Manufacturing Co., Ltd., Nagaokakyo-Shi, Kyoto-fu (JP)

(*) Notice: Subject to any disclaimer, the term of this patent is extended or adjusted under 35 U.S.C. 154(b) by 792 days.

(21) Appl. No.: 12/497,758

(22) Filed: Jul. 6, 2009

(65) Prior Publication Data
US 2010/0007244 A1    Jan. 14, 2010

(30) Foreign Application Priority Data

Jul. 14, 2008 (JP) .................... 2008-182304

(51) Int. Cl.
*H01L 41/08* (2006.01)
*H01L 41/09* (2006.01)

(52) U.S. Cl. ............... 310/323.04; 310/323.06

(58) Field of Classification Search .......... 310/365, 310/366, 328, 369, 323.04–323.09, 15, 1, 310/317; *H01L 41/09, 41/08*
See application file for complete search history.

(56) References Cited

U.S. PATENT DOCUMENTS

| | | | |
|---|---|---|---|
| 6,952,073 B2 * | 10/2005 | Yamamoto | 310/323.06 |
| 7,732,980 B2 * | 6/2010 | Morioke | 310/323.06 |
| 2003/0197447 A1 * | 10/2003 | Yamamoto | 310/323.05 |
| 2011/0215675 A1 * | 9/2011 | Asano | 310/323.06 |

FOREIGN PATENT DOCUMENTS

| | | | | |
|---|---|---|---|---|
| JP | 6-339287 | | 12/1994 | |
| JP | 09-085947 A | | 3/1997 | |
| JP | 11-187677 A | | 7/1999 | |
| JP | 2000-092875 | * | 2/2000 | ......... 410/9 |
| JP | 2000-092875 A | | 3/2000 | |
| JP | 2004-309876 A | | 11/2004 | |
| JP | 2007-208883 A | | 8/2007 | |

* cited by examiner

*Primary Examiner* — Thomas Dougherty
*Assistant Examiner* — Karen B Addison
(74) *Attorney, Agent, or Firm* — Dickstein Shapiro LLP

(57) ABSTRACT

A piezoelectric motor that includes a rotor and a stator having a surface on which a driving member that is in contact with the rotor for rotating the rotor is disposed. The stator includes a stator body, a plurality of piezoelectric elements disposed on a surface of the stator body, and an electrode wiring plate integrally formed with the stator body. The piezoelectric elements are electrically connected to a plurality of electrodes formed on the electrode wiring plate through a plurality of wiring lines. The wiring lines are constituted by an electroconductive film extending from a surface of the stator body to the electrodes.

18 Claims, 13 Drawing Sheets

PIEZOELECTRIC MOTOR AND METHOD OF MANUFACTURING THE SAME

BACKGROUND OF THE INVENTION

1. Field of the Invention

The present invention relates to a piezoelectric motor using a plurality of piezoelectric elements. In particular, the present invention relates to a piezoelectric motor in which a stator including a plurality of piezoelectric elements is vibrated so as to drive a rotor in contact with the stator. The present invention further relates to a method of manufacturing the piezoelectric motor.

2. Description of the Related Art

To date, various piezoelectric motors utilizing ultrasonic vibration caused by the piezoelectric effect have been proposed. A piezoelectric motor is also called an ultrasonic motor because a piezoelectric motor uses ultrasonic vibration caused by piezoelectric elements.

For example, Japanese Unexamined Patent Application Publication No. 06-339287 discloses an ultrasonic motor shown in FIG. 12.

An ultrasonic motor 101 shown in FIG. 12 includes a stator 102, and a slider 103 in contact with the stator 102 and moved by the stator 102. Piezoelectric elements 104 are fixed to the stator 102. The piezoelectric elements 104 each include a piezoelectric body 104a, and electrodes 104b and 104c disposed on end surfaces of the piezoelectric body 104a.

The stator 102 includes a stator body 102a extending in horizontal directions. Protrusions 102b protrude downward from the stator body 102a. The piezoelectric elements 104 are integrated with side surfaces of the protrusions 102b.

Protrusions 102c protrude upward from the stator body 102a. The protrusions 102c serve as an operative section. Ends of the protrusions 102c are in contact with the slider 103.

The stator body 102a is connected to a supporting member 105. The supporting member 105 includes a supporting portion 105a, which is connected to a side of the stator body 102a, and an fixing portion 105b to be fixed to another member. With the fixing portion 105b, the ultrasonic motor 101 is fixed to the other member or to an installation site.

The stator 102, the piezoelectric bodies 104a, and the supporting member 105 are made of PZT and are integrally formed.

When the piezoelectric elements 104 are excited due to the piezoelectric effect, the protrusions 102c are vibrated by the piezoelectric elements 104, and the slider 103 is moved in the longitudinal direction due to the vibration.

Japanese Unexamined Patent Application Publication No. 06-339287 also discloses an annular ultrasonic motor as shown in FIG. 13. In an annular ultrasonic motor 111, an annular stator 112 is supported by a supporting member 113 that is disposed in an opening of the annular stator 112. The supporting member 113 includes supporting portions 113a connected to an inner peripheral surface of the stator 112 and a fixing portion 113b disposed inside the supporting portions 113a. The fixing portion 113b is fixed to another member or to an installation site. Electrodes 114 are disposed on an outer peripheral surface of the annular stator 112 and electrodes 115 are disposed on the inner peripheral surface of the annular stator 112 such that the electrodes 115 partially oppose the electrodes 114. The annular stator 112 is constituted by a piezoelectric body and polarized in directions shown by arrows in FIG. 13. Regions that are polarized in different directions are formed so as to be separated from one another in the circumferential direction.

In the ultrasonic motor 101 shown in FIG. 12, the stator 102 has a complex shape as described above. It may be possible to integrally form the stator 102 and the supporting member 105 by using PZT. However, carrying out this forming process is very difficult in reality. Moreover, it is necessary to connect complex wiring to the electrodes 104b and 104c of the piezoelectric elements 104 using bonding wires or the like. Therefore, problems exist in that troublesome wiring operations have to be performed and a large number of components are required.

In the ultrasonic motor 111 shown in FIG. 13, it is necessary to connect a large number of bonding wires to the electrodes 114 disposed on the outer peripheral surface of the annular stator 112 and to the electrodes 115 disposed on the inner peripheral surface of the annular stator 112. Therefore, problems exist in that troublesome wiring operations have to be performed and a large number of components are required.

SUMMARY OF THE INVENTION

The present invention provides a piezoelectric motor with which troublesome wiring operations for manufacturing the stator can be omitted and the number of components can be reduced, thereby resolving the above-described problems of the related art. The piezoelectric motor can be reduced in size and provided with high reliability. The present invention also provides a method of manufacturing the piezoelectric motor.

According to preferred embodiments of the present invention, a piezoelectric motor includes a rotor and a stator having a surface on which a driving member that is in contact with the rotor for rotating the rotor is disposed. The stator includes a stator body having the surface on which the driving member is disposed; a plurality of piezoelectric elements disposed on the surface of the stator body or on another surface of the stator body opposite the surface; an electrode wiring plate on which a plurality of electrodes electrically connecting the plurality of piezoelectric elements to the outside are formed, the electrode wiring plate integrally formed with the stator body; and a plurality of wiring lines electrically connecting the plurality of piezoelectric elements to the plurality of electrodes formed on the electrode wiring plate, the plurality of wiring lines constituted by an electroconductive film extending from one of the surfaces of the stator body to the electrodes.

In the piezoelectric motor, it is preferable that each of the plurality of piezoelectric elements be made of a ceramic, each of the plurality of piezoelectric elements include a piezoelectric plate having first and second surfaces opposite each other, first and second electrodes be respectively formed on the first and second surfaces of the piezoelectric plate, and the plurality of piezoelectric elements and the stator body be formed by co-firing. In this case, the number of components of the piezoelectric motor required in assembly can be further reduced.

The piezoelectric motor may further include a supporting member connected to the stator body. In this case, the piezoelectric motor can be fixed to another member or to an installation site by connecting the supporting member to the other member or to the installation site, so that movement of the stator is not or only negligibly affected by the connection.

In the piezoelectric motor, the supporting member may be made of a ceramic and may be integrated with the stator body by co-firing. In this case, the number of components required in assembly can be reduced, because the supporting member is integrated with the stator body.

In the piezoelectric motor, the second electrode of the piezoelectric element may be fixed to the surface of the stator body or to the other surface of the stator body opposite the surface. In this case, the thickness of the piezoelectric motor can be reduced, and the piezoelectric element can be easily integrated with the stator body.

In the piezoelectric motor, the stator body may have a substantially annular shape having an opening in the middle thereof, the electrode wiring plate may be smaller than the opening of the stator body, and the electrode wiring plate may be disposed in the opening of the stator body. In this case, the piezoelectric motor can be further reduced in size.

According to preferred embodiments of the present invention, a method of manufacturing a piezoelectric motor, the piezoelectric motor being configured according to preferred embodiments of the present invention, includes the steps of preparing a mother structure including a mother stator body in which a plurality of the stator bodies are arranged and a plurality of the piezoelectric elements are integrated with each of the stator bodies, obtaining individual stators by cutting the mother structure, each of the individual stators including a stator body and a plurality of piezoelectric elements of a piezoelectric motor, and assembling the stator and the rotor.

A piezoelectric motor according to preferred embodiments of the present invention is structured such that a plurality of piezoelectric elements are arranged on a surface of a stator body or on another surface of the stator body opposite the surface, an electrode wiring plate is integrated with the stator body, the plurality of piezoelectric elements are electrically connected a plurality of electrodes formed on the electrode wiring plate through a plurality of wiring lines constituted by an electroconductive film extending from the surface of the stator body to the electrodes. Therefore, the piezoelectric motor can be manufactured without performing troublesome wiring operations using bonding wires or the like. Moreover, the number of components in assembly can be reduced. Therefore, the piezoelectric motor can be reduced in size and the reliability of the piezoelectric motor can be improved.

Using the method of manufacturing a piezoelectric motor according to preferred embodiments of the present invention, a stator body of a piezoelectric motor and a stator having a plurality of piezoelectric elements can be obtained only by preparing a mother structure including a mother stator body and a plurality of piezoelectric elements integrated with the mother stator body and cutting the mother structure. Therefore, the piezoelectric motor according to the present invention can be efficiently manufactured.

Other features, elements, characteristics and advantages of the present invention will become more apparent from the following detailed description of preferred embodiments of the present invention with reference to the attached drawings.

DESCRIPTION OF THE PREFERRED EMBODIMENTS

Hereinafter, embodiments of the present invention are described with reference to the drawings.

Figure 1:
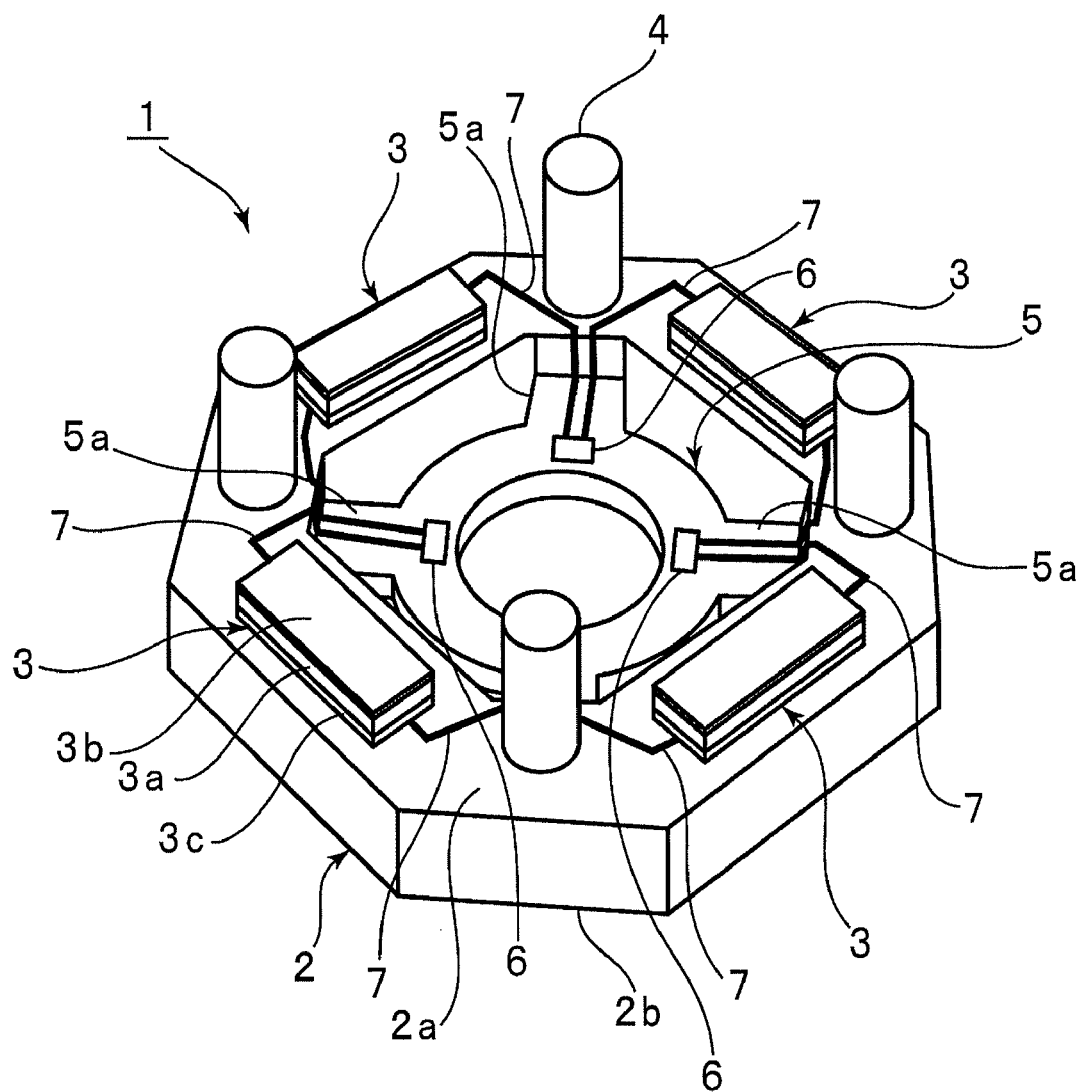
FIG. 1 is a perspective view of a stator used in a piezoelectric motor according to a first embodiment of the present invention.

FIG. 1 is a perspective view showing a stator of a piezoelectric motor according to a first embodiment of the present invention.

As shown in FIG. 1, a stator 1 includes a substantially annular stator body 2. The outer periphery and the inner periphery of the substantially annular stator body 2 are substantially octagonal. The stator body 2 includes an upper surface 2a and a lower surface 2b opposite the upper surface 2a. Piezoelectric elements 3 are arranged and fixed on the upper surface 2a in the circumferential direction of the upper surface 2a.

Each of the piezoelectric elements 3 includes a piezoelectric plate 3a made of a ceramic, a first electrode 3b formed on a first surface of the piezoelectric plate 3a, and a second electrode 3c formed on a second surface opposite the first surface. The piezoelectric plate 3a is made of piezoelectric ceramic. In the embodiment, the piezoelectric plate 3a is polarized in the thickness direction. However, the polarization direction of the piezoelectric plate 3a is not limited to this.

The second electrode 3b of the piezoelectric element 3 is attached to the upper surface 2a of the stator body 2 so that the piezoelectric element 3 is integrated with the stator body 2. In the embodiment, the piezoelectric element 3 is integrated with the stator body 2 using a co-firing technique as described below.

On the upper surface 2a of the stator body 2, a protrusion 4 stands between each adjacent pair of the piezoelectric elements 3. Ends of the protrusions 4 are in contact with a rotor, so that the protrusions 4 serve as a driving member for driving the rotor.

The protrusions 4 are made of the same material as the stator body 2 and integrally formed with the stator body 2 by co-firing.

An electrode wiring plate 5 is disposed inside the substantially annular stator body 2. In the embodiment, the electrode wiring plate 5 has a substantially annular shape. The outer diameter of the substantially annular electrode wiring plate 5 is smaller than the diameter of the opening of the substantially annular stator body 2. Thus, the electrode wiring plate 5 is disposed in the opening of the stator body 2. Since the electrode wiring plate 5 is disposed in the opening of the stator body 2, the stator 1 can be reduced in size. The electrode wiring plate 5 may have a shape other than the substantially annular shape.

The electrode wiring plate 5 includes connection portions 5a extending outward in radial directions from the outer periphery of a body portion of the electrode wiring plate 5. Ends of the connection portions 5a are connected to an inner side surface of the stator body 2. Electrodes 6 are disposed on the upper surface of the electrode wiring plate 5. The electrodes 6 are electrically connected to the first electrodes 3b or to the second electrodes 3c of the piezoelectric elements 3 through wiring lines 7. Each of the wiring lines 7 extends from the upper surface 2a, through the inner side surface of the stator body 2, through the upper surface of the corresponding connection portion 5a, and to the electrode wiring plate 5. The wiring lines 7 are made of an electroconductive film that is formed by coating and baking an electroconductive paste. The electrodes 6 are also formed by coating and baking an electroconductive paste.

Since the stator 1 of the piezoelectric motor of the embodiment has the above-described structure, it is not necessary to perform complicated wiring operations using a large number of bonding wires in order to make electrical connections to the first and second electrodes 3b and 3c of the piezoelectric elements 3. Moreover, since a large number of bonding wires are not necessary, the number of components required in assembly can be reduced.

Furthermore, a manufacturing process can be simplified, since the stator body 2, the piezoelectric elements 3, the protrusions 4, and the electrode wiring plate 5 can be obtained by using a ceramic co-firing technique. Referring to FIGS. 2 to 5, the manufacturing process is described further in detail.

Figure 2:
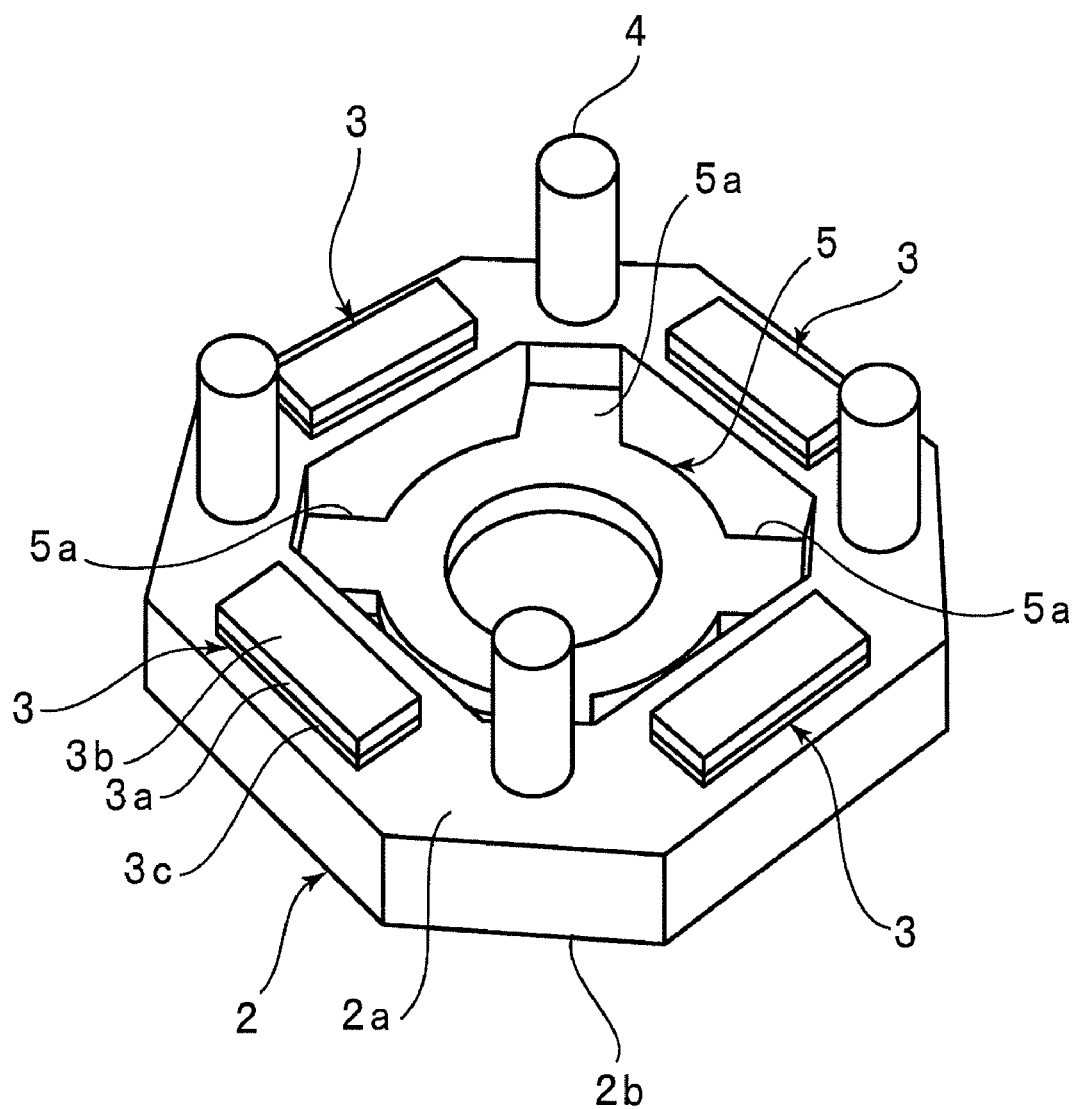
FIG. 2 is a perspective view showing a state in which electrodes and wiring lines are removed from the stator shown in FIG. 1.
Figure 3:
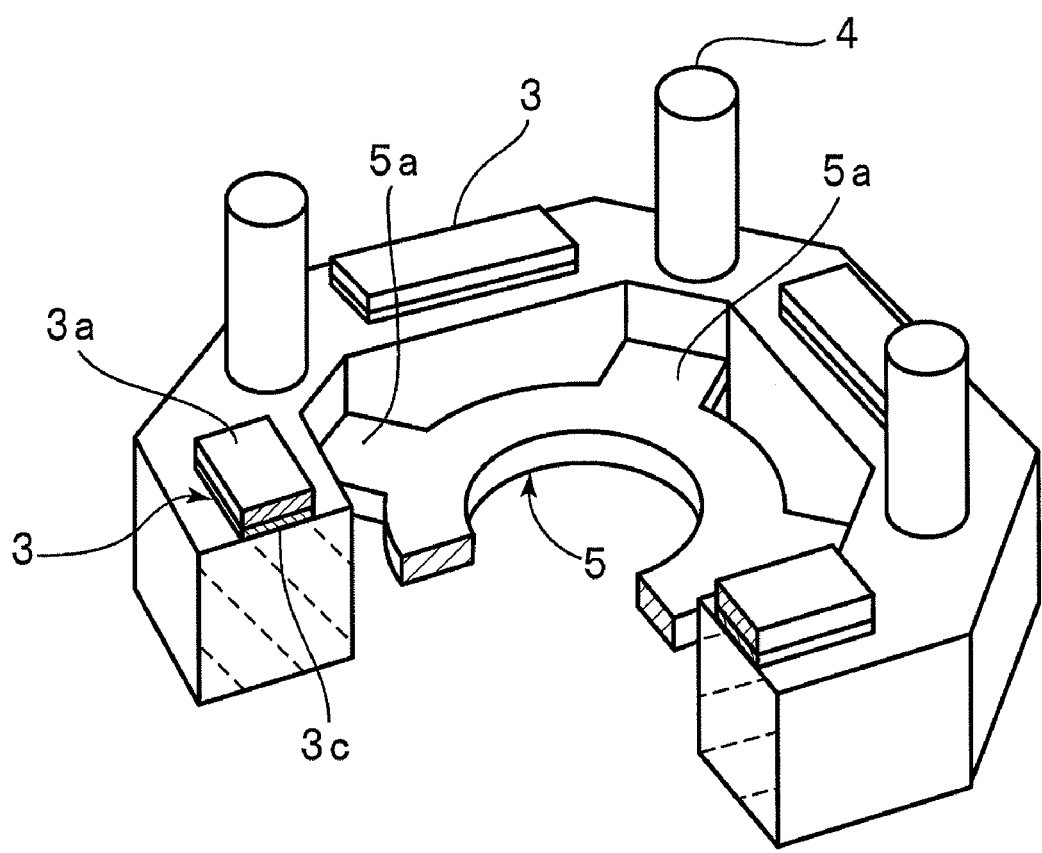
FIG. 3 is a partial cross-sectional perspective view illustrating main parts of the stator shown in FIG. 2.

FIG. 2 is a perspective view showing a state in which the electrodes 6 and the wiring lines 7 are removed from the stator 1. FIG. 3 is a partial cross-sectional perspective view showing the cross-sectional structure of a part of the stator shown in FIG. 2. As can be seen from FIGS. 2 and 3, the electrode wiring plate 5 has a thickness smaller than the thickness of the stator body 2. The connection portions 5a are connected to the inner side surface of the stator body 2 at mid-height positions of the inner side surface of the stator body 2. The connection portions 5a have the same thickness as the body portion of the substantially annular electrode wiring plate 5. The connection portions 5a are arranged in the same plane as the body portion. Therefore, the electrode wiring plate 5 is disposed in the opening of the substantially annular stator body 2 at a mid position in the thickness direction of the stator body 2.

Figure 5:
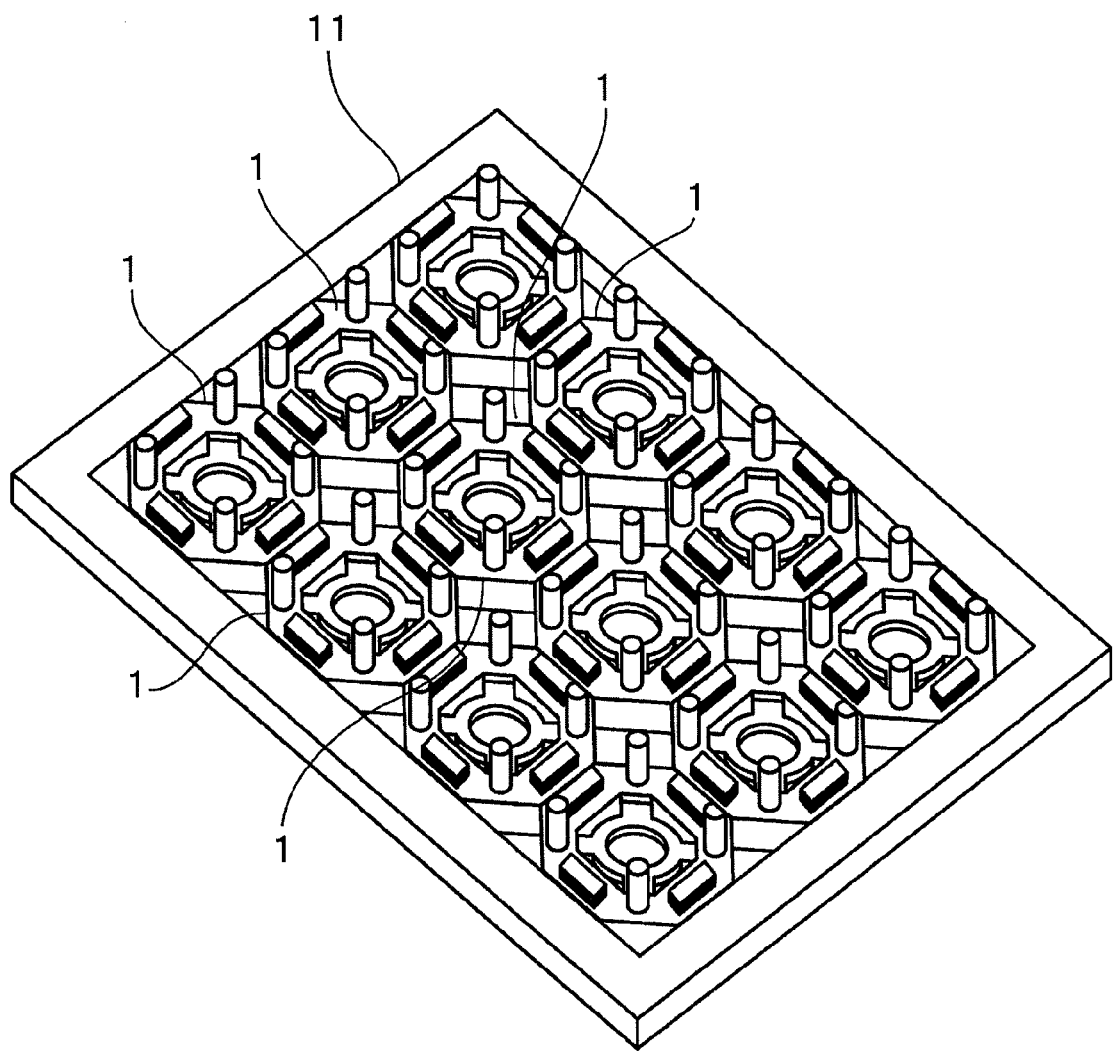
FIG. 5 is a perspective view of a mother structure prepared for obtaining the stator shown in FIG. 1 therefrom.

A method of manufacturing the stator 1 is described in detail. FIG. 2 shows the stator 1 before the electrodes are formed thereon. In the manufacturing method of the embodiment, a mother structure in which a plurality of the stators 1 are arranged is first prepared. FIG. 5 is a perspective view showing a mother structure 11. A plurality of the stators 1 shown in FIG. 2 are arranged in a matrix pattern across the surface of the mother structure 11. This structure is obtained using a ceramic co-firing technique.

In the embodiment, the stator body 2, the piezoelectric elements 3, the protrusions 4, and the electrode wiring plate 5 are formed using a ceramic co-firing technique. In this case, the first and second electrodes 3b and 3c are formed by coating and baking an electroconductive paste as described above, wherein the baking is performed as part of the ceramic co-firing. As a ceramic material for the piezoelectric plate 3a, piezoelectric ceramic suitable for the piezoelectric elements 3, such as PZT ceramic, can be used. However, another piezoelectric ceramic may be used.

The stator body 2, the protrusions 4, and the electrode wiring plate 5 may be made of the same piezoelectric ceramic as the piezoelectric ceramic for the piezoelectric plate 3a. In this case, the number of types of ceramic materials can be reduced, and conditions of co-firing can be easily controlled.

However, the stator body 2, the protrusions 4, and the electrode wiring plate 5 may be made of different ceramic materials suitable for their functions. For example, the stator body 2 may be made of an insulating ceramic, such as $Al_2O_3$, which has an excellent mechanical strength. Likewise, it is preferable that the protrusions 4 be made of an insulating ceramic, such as $Al_2O_3$, which has an excellent mechanical strength.

It is preferable that the electrode wiring plate 5 be made of an insulating ceramic, such as $Al_2O_3$, so that the electrode wiring plate 5 does not exhibit the piezoelectric effect or the like, since the electrodes 6 and the wiring lines 7 are formed on the surface of the electrode wiring plate 5.

When ceramics different from the piezoelectric ceramic of the piezoelectric plate 3a are used for making the stator body 2, the protrusions 4, and the electrode wiring plate 5, the number of types of ceramic materials is increased.

In the manufacturing method of the embodiment, the first electrodes 3b at the top of the piezoelectric elements 3 are also made by co-firing. However, the first electrodes 3b may be formed by coating and baking an electroconductive paste after co-firing.

In the method of manufacturing the stator of the embodiment, the mother structure 11 shown in FIG. 5 is first prepared, and then the electrodes 6 and the wiring lines 7 are formed. The electrodes 6 and the wiring lines 7 can be formed by coating and baking an electroconductive paste. However, the electrodes 6 and the wiring lines 7 may be formed as part of the co-firing process for making the mother structure 11. That is, the electrodes 6 and the wiring lines 7 may be formed by printing a pattern on an electroconductive paste and baking the electroconductive paste in the co-firing process.

Next, the mother structure 11 is cut in the thickness direction, so that individual stators having the same structure as the stator 1 as shown in FIG. 1 are obtained. Therefore, in the manufacturing method of the embodiment, a mother structure 11 including a mother stator body in which a plurality of stator bodies 2 are arranged and a plurality of piezoelectric elements 3 integrated with each of the stator bodies 2 is prepared, and the mother structure 11 is cut, so that individual stators 1 each including a stator body 2 and a plurality of piezoelectric elements 3 can be efficiently obtained. Then, the stator can be assembled with a rotor, so that a piezoelectric motor is obtained by a comparatively safe process.

Figure 4:
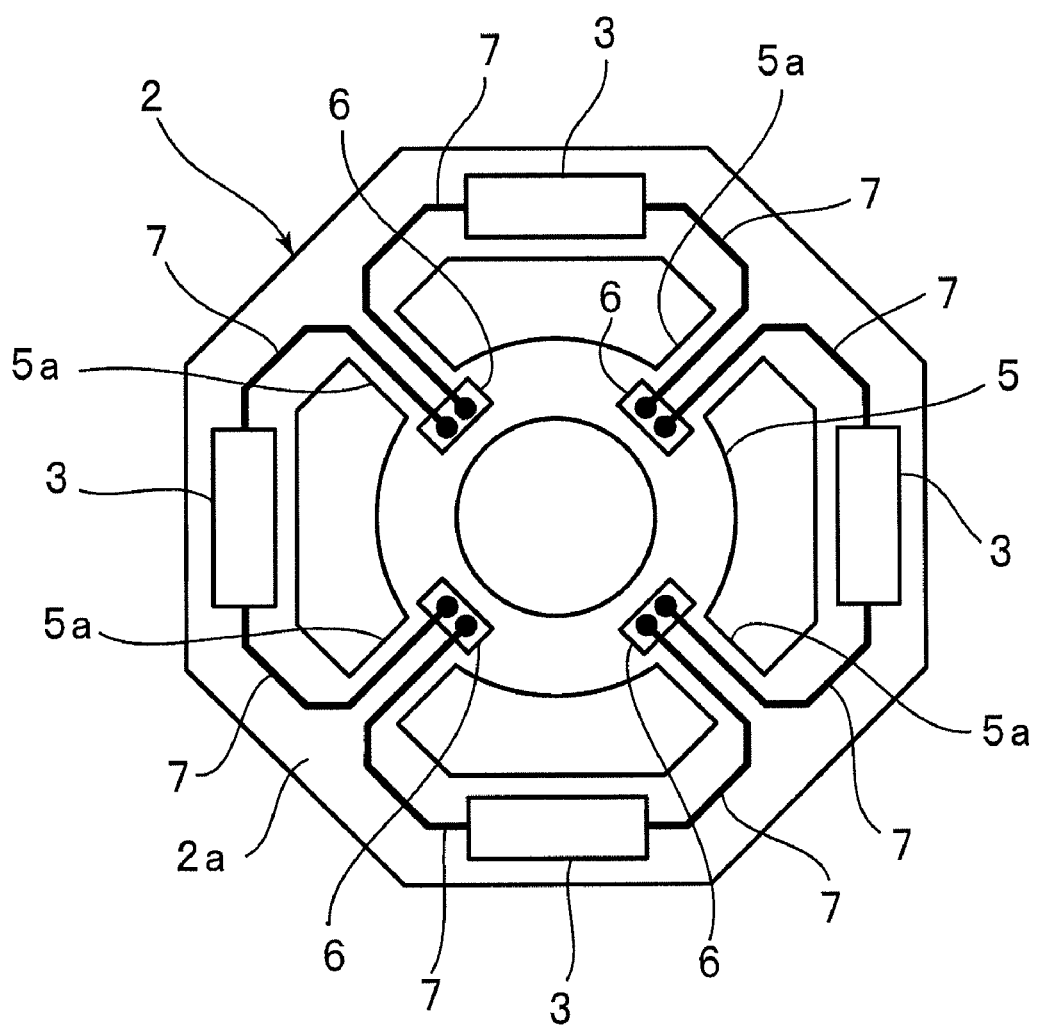
FIG. 4 is a schematic plan view showing the structure of the electrodes and the wiring lines of the stator used in the embodiment shown in FIG. 1.

FIG. 4 is a schematic plan view showing the disposition of the electrodes 6 and the wiring lines 7. An end of each of the wiring lines 7 is electrically connected to the first or second electrode 3b or 3c of the corresponding piezoelectric element 3. The other end of each of the wiring lines 7 is electrically connected to the corresponding electrode 6 formed on the electrode wiring plate 5.

In the piezoelectric motor of the embodiment, the electrode wiring plate 5 is connected to an external member so as to be fixed to the external member. Thus, the stator 1 can be securely vibrated in a desired manner without being affected by vibrations from the outside.

Figure 6:
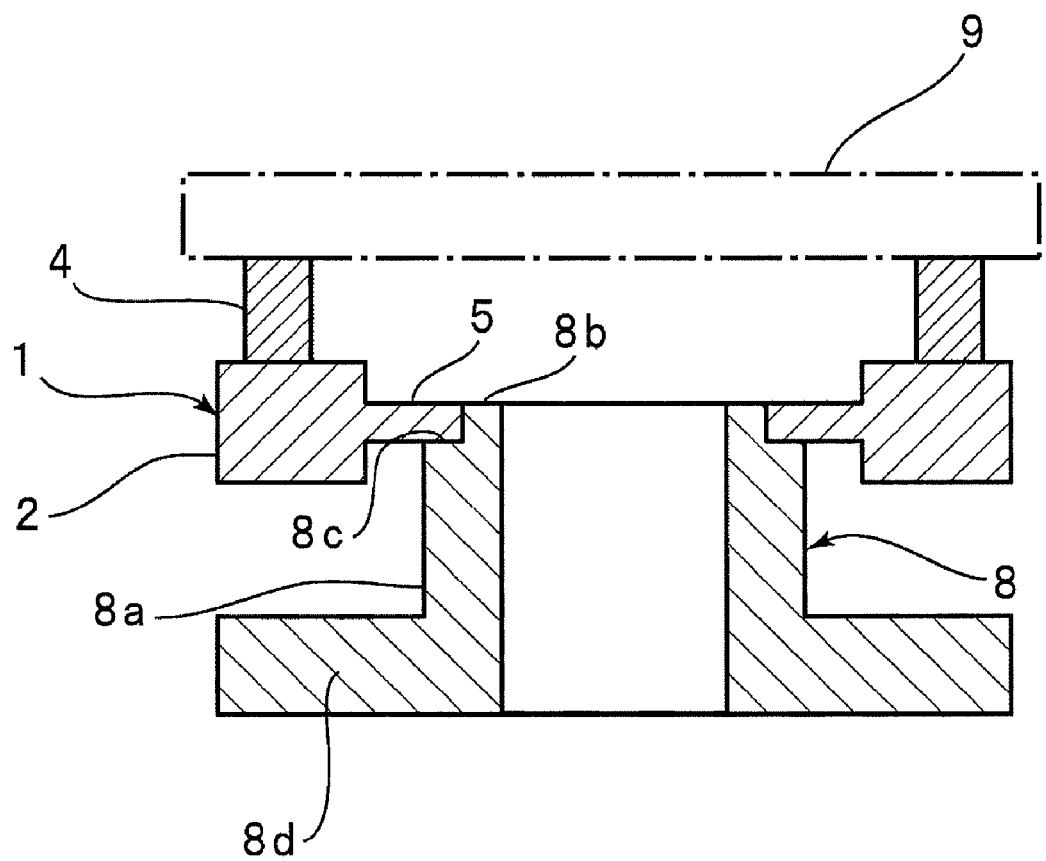
FIG. 6 is a schematic sectional view of the piezoelectric motor according to the first embodiment of the present invention.

It is preferable that the electrode wiring plate 5 be connected to the outside by connecting a supporting member 8 to the lower surface of the electrode wiring plate 5 as shown in FIG. 6. The supporting member 8 includes a substantially cylindrical supporting portion 8a and a fitting portion 8b disposed on top of the substantially cylindrical supporting portion 8a. The fitting portion 8b has an outer diameter smaller than the outer diameter of the substantially cylindrical supporting portion 8a. The fitting portion 8b is fitted into the electrode wiring plate 5. An upper end surface 8c of the substantially cylindrical supporting portion 8a is in contact with the lower surface of the electrode wiring plate 5. The height of the fitting portion 8b is the same as the thickness of the electrode wiring plate 5. Thus, the upper surface of the fitting portion 8b is flush with the upper surface of the electrode wiring plate 5, so that electrode wiring plate 5 can be more securely supported by the supporting member 8. However, the height of the fitting portion 8b is not particularly limited. Alternatively, the fitting portion 8b may be omitted.

At the bottom of the substantially cylindrical supporting portion 8a, a base 8d extends outward in the radial direction from the outer periphery of the substantially cylindrical supporting portion 8a. The base 8d corresponds to the portion at which the piezoelectric motor is attached to an installation site. However, the base 8d may be omitted.

In FIG. 6, a rotor 9 is indicated by an alternate long and short dash line. The rotor 9 is disposed such that the rotor 9 is in contact with the protrusions 4 protruding upward from the stator body 2. The rotor 9, together with the stator 1, constitutes the piezoelectric motor of the embodiment. The rotor 9 may have any planar shape, as long as the rotor 9 can be rotated with the protrusions 4. For example, the rotor 9 may be substantially annular, substantially circular, or substantially polygonal.

Figure 7:
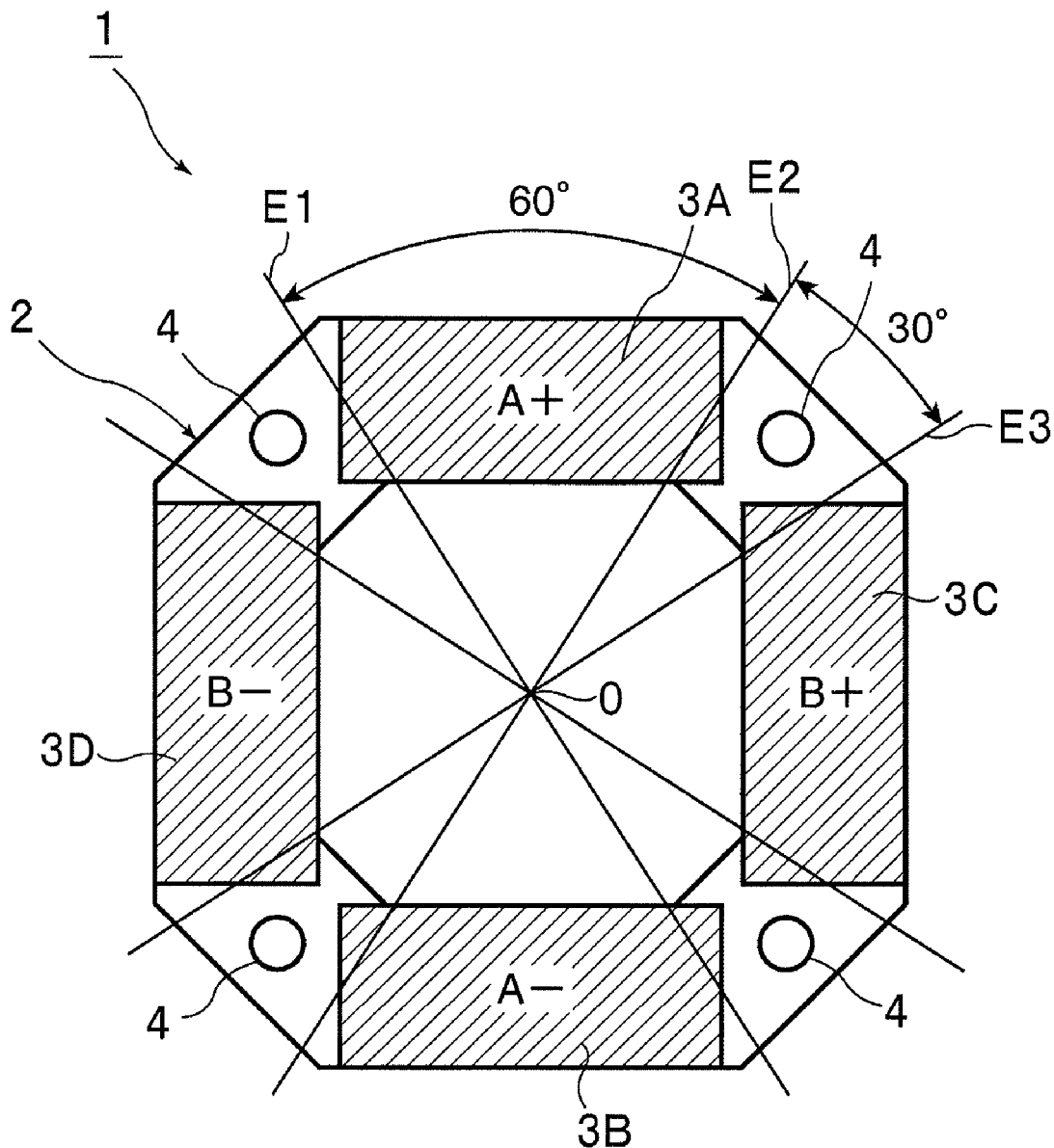
FIG. 7 is a schematic plan view illustrating the operating principle of the piezoelectric motor according to the first embodiment of the present invention.

FIG. 7 is a schematic plan view illustrating the driving principle of the piezoelectric motor of the embodiment.

Piezoelectric bodies of the first and second piezoelectric elements 3A and 3B facing each other are polarized in opposite thickness directions. Likewise, piezoelectric bodies of the third and fourth piezoelectric elements 3C and 3D facing each other are polarized in opposite thickness directions.

Among the piezoelectric elements 3A to 3D, the first and second piezoelectric elements 3A and 3B facing each other constitute an A-phase driver. The third and fourth piezoelectric elements 3C and 3D constitute a B-phase driver. The piezoelectric elements of the A-phase driver are indicated by A+ or A−, and the piezoelectric elements of the B-phase driver are indicated by B+ or B−. The symbols A+ and A− indicate that the piezoelectric bodies are polarized in opposite thickness directions. The same applies to the B-phase driver.

The first to fourth piezoelectric elements 3A to 3D have a substantially rectangular planar shape. Thus, the piezoelectric elements can be efficiently manufactured at low cost. However, in the present invention, the piezoelectric elements 3A to 3D may have a planar shape other than the substantially rectangular shape, such as a substantially sectorial shape. The piezoelectric elements 3A to 3D have the same planar shape. Hereinafter, the piezoelectric element 3A is described as a representative example of the piezoelectric elements 3A to 3D.

Imaginary lines that connect the midpoints of first and second short sides of the piezoelectric element 3A and the center O are referred to as imaginary lines E1 and E2, respectively. The angle (central angle) between the imaginary lines E1 and E2 is about 60°. In other words, a length L between the midpoints of the first and second short sides of the piezoelectric element 3A corresponds to the central angle of about 60°. In the embodiment, three standing waves are excited and combined, so that three progressive waves are generated. When the central angle corresponding to the wavelength of the three progressive waves is $\lambda_\theta$, the length L corresponds to the central angle of $\lambda_\theta/2$. The second to fourth piezoelectric elements 3B to 3D have the same length.

The length of the piezoelectric element is defined by the central angle because the length of the piezoelectric element varies in proportion to the radial distance between the piezoelectric element and the center. In other words, since the distance between the imaginary lines E1 and E2 varies in accordance with the position in the radial direction, the length of the piezoelectric element is expressed in terms of the central angle.

In this document, the term "circumferential direction" refers to the direction in which two standing waves generated in a vibrating body and a progressive wave generated by combining the two standing waves travel. The term "center" used for defining the central angle refers to the center of a circumferential path along which the progressive wave travels.

The interval or the distance between an adjacent pair of the piezoelectric elements in the circumferential direction corresponds to a central angle of about 30°. In FIG. 7, for example, the distance between the imaginary line E2 and an imaginary line E3 corresponds to a central angle of $\lambda_\theta/4 \approx 30°$, wherein E3 is an imaginary line that connects the center O and the midpoint of a short side of the piezoelectric element 3C adjacent to the piezoelectric element 3A.

Thus, adjacent piezoelectric elements are distanced by a central angle of $\lambda_\theta/4$ in the circumferential direction.

When the piezoelectric motor is driven and a progressive wave is generated in the substantially annular stator body 2 made of an elastic member, the ends of the protrusions 4 perform elliptical motion. Thus, the rotor 9, which is in close contact with the protrusions 4, is rotated.

Figure 8:
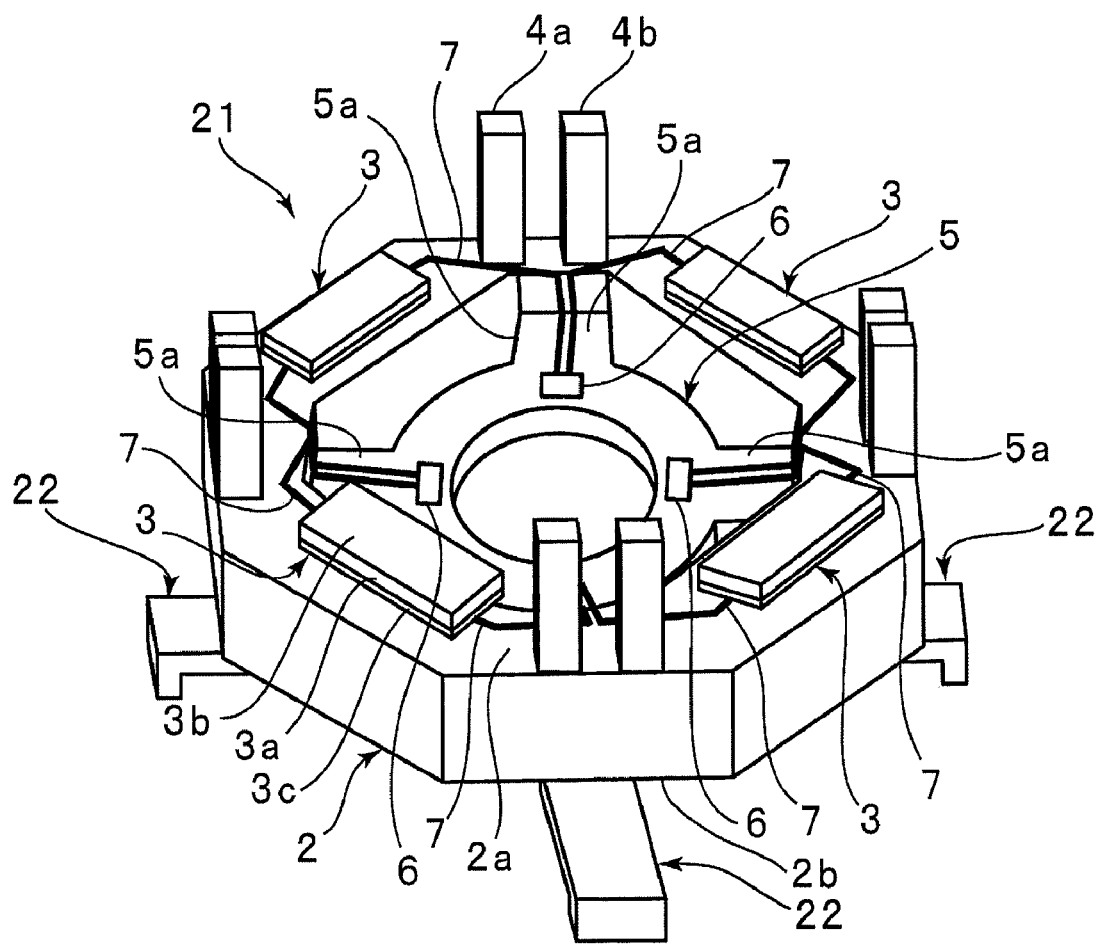
FIG. 8 is a perspective view illustrating a stator used in a piezoelectric motor according to a second embodiment of the present invention.
Figure 9:
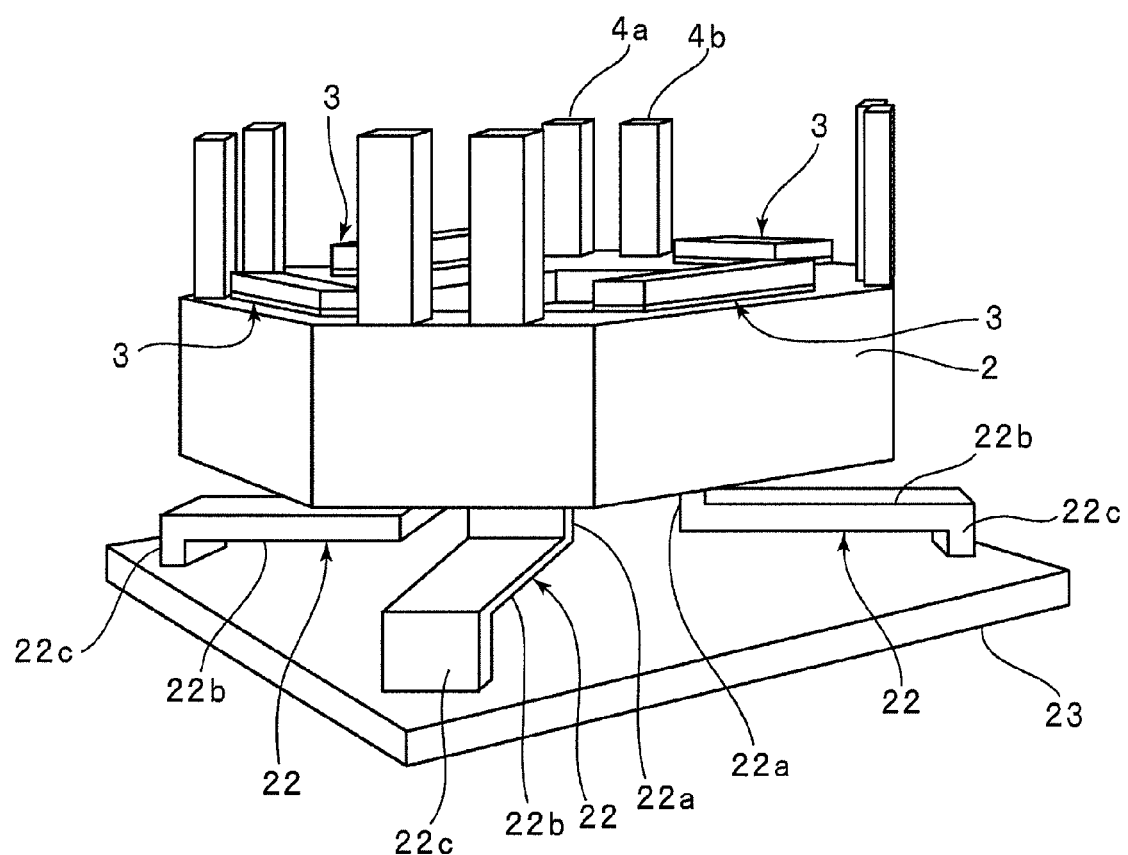
FIG. 9 is a perspective view of the stator shown in FIG. 8 viewed from a different viewpoint.

FIG. 8 is a perspective view showing a stator used in a second embodiment of the piezoelectric motor of the present invention. FIG. 9 is a perspective view of the stator shown in FIG. 8 viewed from a different angle. As in the first embodiment, a stator 21 of the piezoelectric motor of the second embodiment includes a substantially annular stator body 2 having an octagonal outer periphery, and piezoelectric elements 3 arranged and fixed on an upper surface 2a of the stator body 2. The second embodiment is different from the first embodiment in that the stator 21 includes, instead of the substantially cylindrical protrusions 4, a pair of prism-shaped protrusions 4a and 4b disposed between each adjacent pair of piezoelectric elements 3 and a supporting member having a different shape. The other portions are the same as those of the first embodiment. The same portions are indicated by the same numerals and detailed descriptions of such portions are omitted.

As shown in FIGS. 8 and 9, a pair of prism-shaped protrusions 4a and 4b stand between each adjacent pairs of piezoelectric elements 3. As in this case, a plurality of protrusions serving as a driving member for rotating the rotor may be provided between each adjacent pair of piezoelectric elements 3. Besides the substantially cylindrical shape, the protrusions may have any shape such as a prism.

Figure 10:
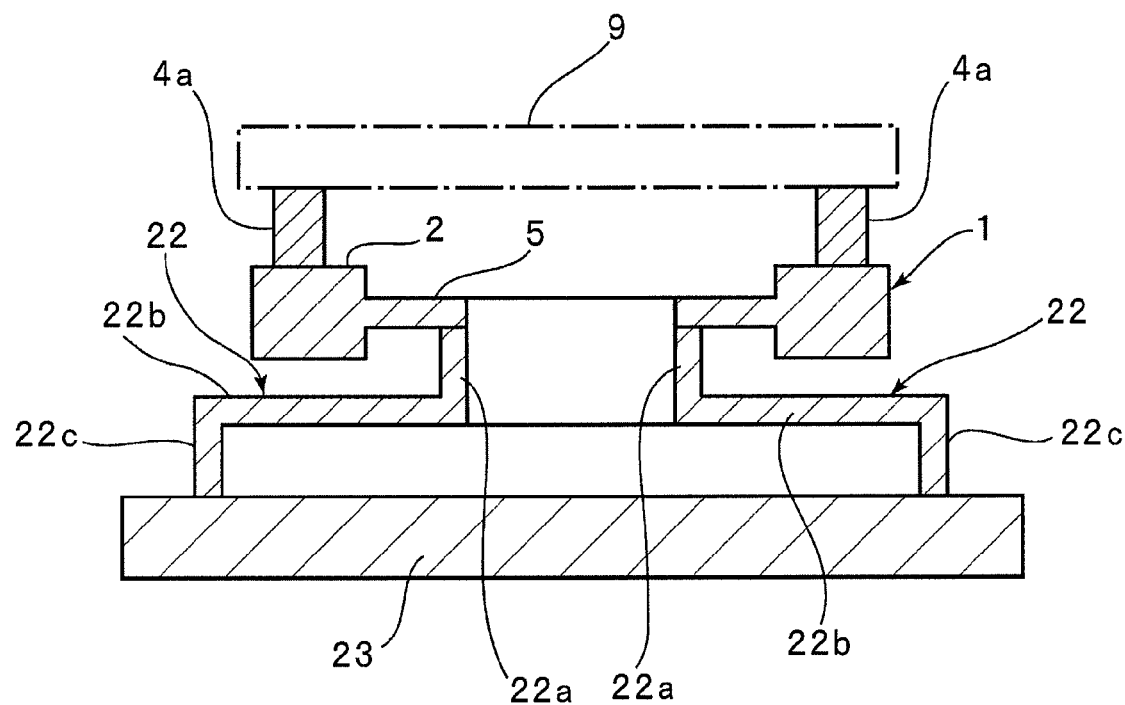
FIG. 10 is a schematic sectional view illustrating the piezoelectric motor according to the second embodiment.

As shown in FIGS. 8 to 10, in the embodiment, a plurality of supporting members 22 are connected to an electrode wiring plate 5. Each of the supporting members 22 includes a first portion 22a extending downward from the lower surface of the electrode wiring plate 5, a second portion 22b extending horizontally outward from the bottom end of the first portion 22a, and a third portion 22c extending downward from the outer edge of the second portion 22b. The bottom end of the third portion 22c is connected to a base 23.

As described above, the supporting portion of the piezoelectric motor according to the present invention may have any shape as long as the shape is suitable for mechanically supporting the electrode wiring plate 5.

In the second embodiment, as in the first embodiment, the stator body 2, the piezoelectric elements 3, the protrusions 4a and 4b, and the supporting member 22 can be made using a ceramic co-firing technique. Thus, the number of components can be reduced and the manufacturing process can be simplified.

Figure 11:
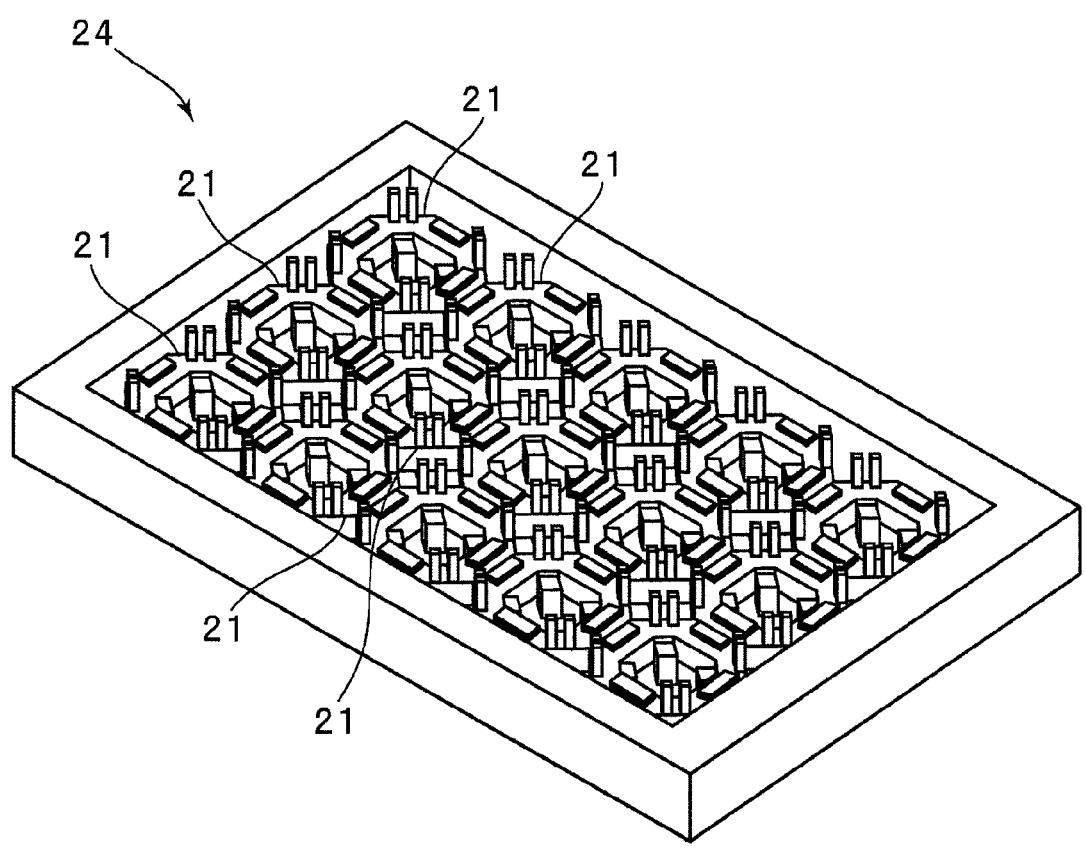
FIG. 11 is a perspective view of a mother structure prepared for the second embodiment.
Figure 12:
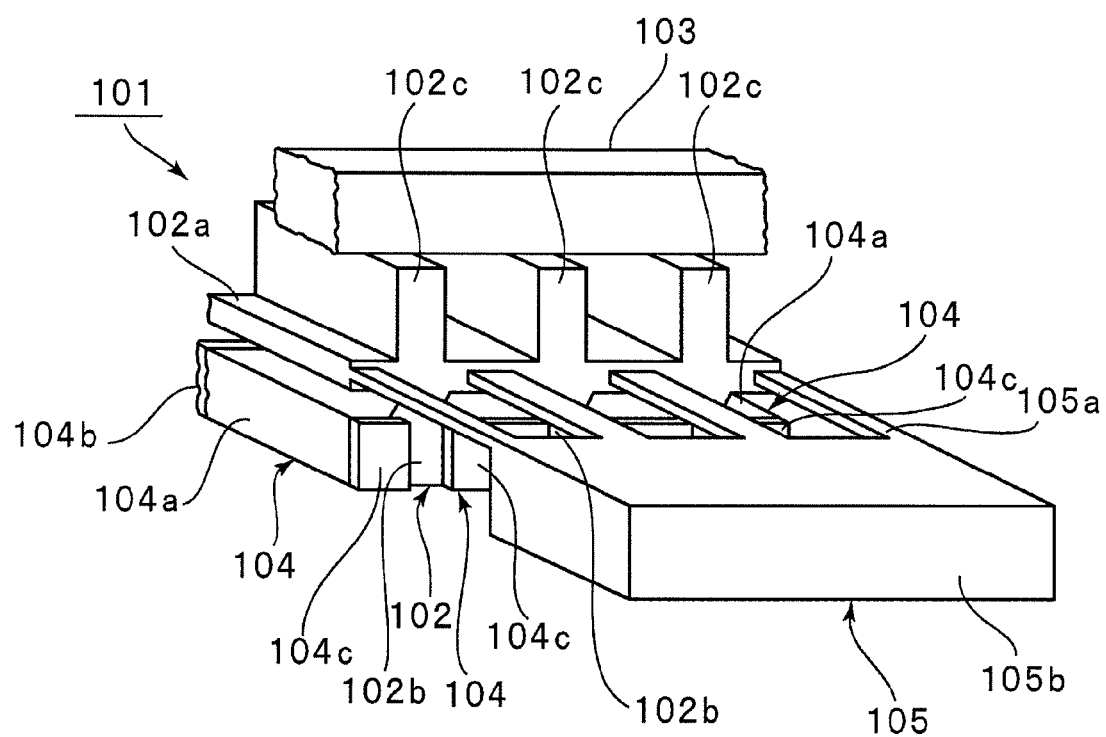
FIG. 12 is a partial cutaway perspective view illustrating an example of an ultrasonic motor according to the existing art.
Figure 13:
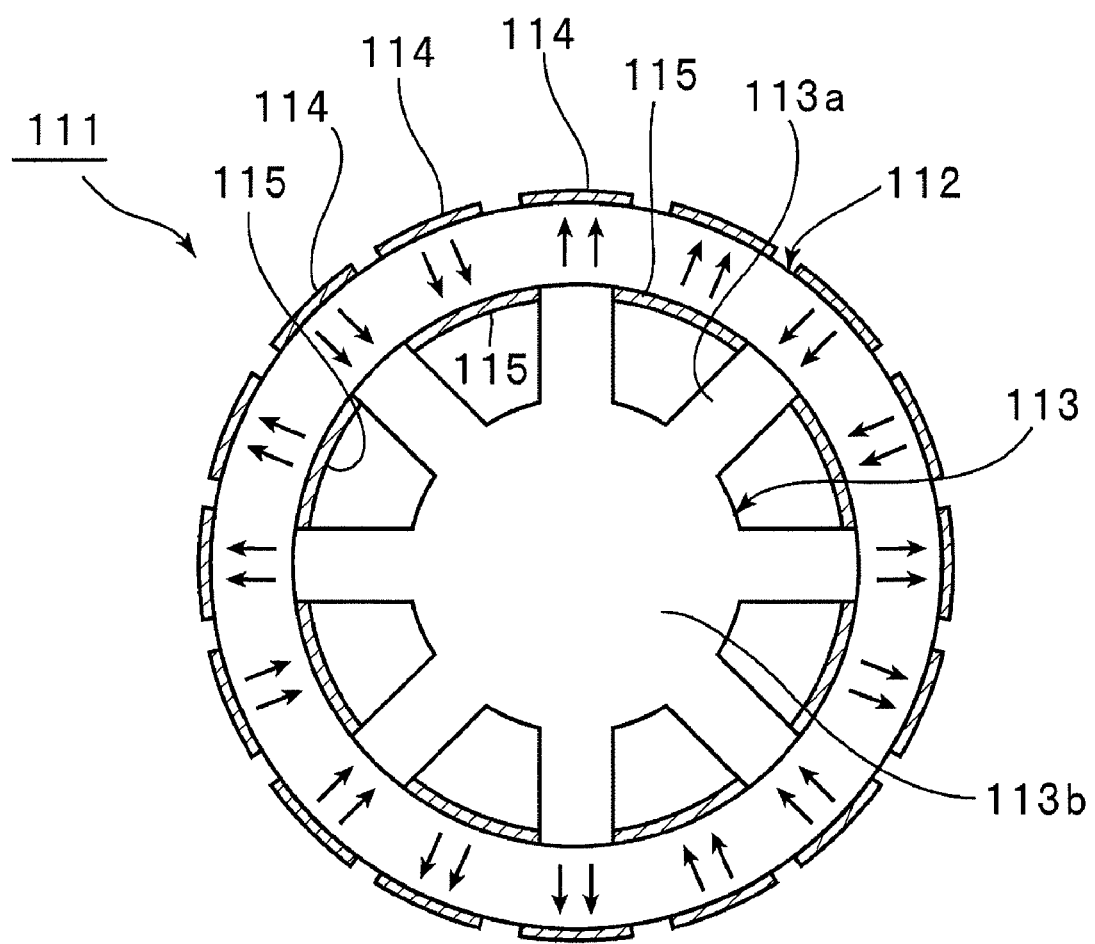
FIG. 13 is a schematic plan view illustrating another example of an ultrasonic motor according to the existing art.

To be specific, a mother structure 24 as shown in FIG. 11 is prepared. In the mother structure 24, a plurality of stators each having the same structure as that of the stator 21 as shown in FIG. 8, from which electrodes and wiring lines are removed, are arranged. Therefore, after the mother structure 24 is prepared, the electrodes 6 and the wiring lines 7 are formed, and the mother structure 24 is cut in the thickness direction, so that an individual stator 21 is efficiently obtained. As schematically shown in the upper portion of the FIG. 10, a rotor is assembled with the stator so as to provide a piezoelectric motor.

In the second embodiment, the stator body 2, the piezoelectric elements 3, the protrusions 4a and 4b, and the supporting member 22 can be made using a ceramic co-firing technique, so that the manufacturing process is simplified and the number of components can be reduced. Ceramic components used in the second embodiment may be made of the same ceramic material or of different ceramic materials.

In the first and second embodiments, the supporting members 8 and 22 are co-fired with the stator body 2 as part of the process for firing the stator body 2. However, the supporting member may be attached to the stator after the stator has been obtained.

Likewise, the piezoelectric elements 3 may be attached to and integrated with the stator body 2 after the stator body 2 has been obtained. However, it is preferable that, as in the first and second embodiments, the piezoelectric elements 3 and the stator body 2 be made using a co-firing technique, so that the number of components in assembly can be reduced and the manufacturing process can be simplified.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A piezoelectric motor comprising:
   a rotor;
   a stator; and
   a driving member disposed on a surface of the stator and in contact with the rotor,
   wherein the stator includes
      a stator body having the surface on which the driving member is disposed,
      a plurality of piezoelectric elements disposed on the surface of the stator body or on another surface of the stator body opposite the surface,
      an electrode wiring plate having a plurality of electrodes, and
      a plurality of wiring lines on the electrode wiring plate, the plurality of wiring lines electrically connecting the plurality of piezoelectric elements to the plurality of electrodes,
   wherein the electrode wiring plate is integral with the stator body.

2. The piezoelectric motor according to claim 1, wherein each of the plurality of piezoelectric elements is a ceramic, and
   wherein each of the plurality of piezoelectric elements includes a piezoelectric plate having first and second surfaces opposite each other, and first and second electrodes respectively on the first and second surfaces of the piezoelectric plate.

3. The piezoelectric motor according to claim 1, wherein the plurality of wiring lines are constituted by an electroconductive film extending to the electrodes.

4. The piezoelectric motor according to claim 1, further comprising a supporting member connected to the stator body.

5. The piezoelectric motor according to claim 1, wherein the plurality of piezoelectric elements are polarized in a thickness direction thereof.

6. The piezoelectric motor according to claim 1, wherein opposed piezoelectric elements of the plurality of piezoelectric elements are polarized in opposite thickness directions.

7. The piezoelectric motor according to claim 1, wherein the driving member is a cylindrical protrusion.

8. The piezoelectric motor according to claim 1, wherein the driving member is a pair of prism shaped protrusions.

9. A piezoelectric motor comprising:
   a rotor;
   a stator, wherein the stator includes
      a stator body having the surface on which the driving member is disposed,
      a plurality of piezoelectric elements disposed on the surface of the stator body or on another surface of the stator body opposite the surface,
      an electrode wiring plate having a plurality of electrodes, and
      a plurality of wiring lines on the electrode wiring plate, the plurality of wiring lines electrically connecting the plurality of piezoelectric elements to the plurality of electrodes;
   a driving member disposed on a surface of the stator and in contact with the rotor; and
   a supporting member connected to the stator body,
   wherein the supporting member is a ceramic and is integrated with the stator body.

10. A piezoelectric motor comprising:
    a rotor;
    a stator; and
    a driving member disposed on a surface of the stator and in contact with the rotor,
    wherein the stator includes
       a stator body having the surface on which the driving member is disposed,
       a plurality of piezoelectric elements disposed on the surface of the stator body or on another surface of the stator body opposite the surface,
       an electrode wiring plate having a plurality of electrodes, and
       a plurality of wiring lines on the electrode wiring plate, the plurality of wiring lines electrically connecting the plurality of piezoelectric elements to the plurality of electrodes,
    wherein each of the plurality of piezoelectric elements is a ceramic,
    wherein each of the plurality of piezoelectric elements includes a piezoelectric plate having first and second surfaces opposite each other, and first and second electrodes respectively on the first and second surfaces of the piezoelectric plate, and
    wherein the second electrode of the piezoelectric element is fixed to the surface of the stator body or to the other surface of the stator body opposite the surface.

11. A piezoelectric motor comprising:
a rotor;
a stator; and
a driving member disposed on a surface of the stator and in contact with the rotor,
wherein the stator includes
   a stator body having the surface on which the driving member is disposed,
   a plurality of piezoelectric elements disposed on the surface of the stator body or on another surface of the stator body opposite the surface,
   an electrode wiring plate having a plurality of electrodes, and
   a plurality of wiring lines on the electrode wiring plate, the plurality of wiring lines electrically connecting the plurality of piezoelectric elements to the plurality of electrodes,
wherein the stator body has a substantially annular shape having an opening in the middle thereof, the electrode wiring plate is smaller than the opening of the stator body, and the electrode wiring plate is disposed in the opening of the stator body.

12. A stator comprising:
a stator body;
a driving member disposed on a surface of the stator body;
a plurality of piezoelectric elements disposed on the surface of the stator body or on another surface of the stator body opposite the surface;
an electrode wiring plate having a plurality of electrodes and integral with the stator body; and
a plurality of wiring lines on the electrode wiring plate, the plurality of wiring lines electrically connecting the plurality of piezoelectric elements to the plurality of electrodes.

13. The stator according to claim 12, wherein each of the plurality of piezoelectric elements is a ceramic, and
   wherein each of the plurality of piezoelectric elements includes a piezoelectric plate having first and second surfaces opposite each other, and first and second electrodes respectively on the first and second surfaces of the piezoelectric plate.

14. The stator according to claim 12, wherein the stator body has a substantially annular shape having an opening in the middle thereof, the electrode wiring plate is smaller than the opening of the stator body, and the electrode wiring plate is disposed in the opening of the stator body.

15. The stator according to claim 12, wherein opposed piezoelectric elements of the plurality of piezoelectric elements are polarized in opposite thickness directions.

16. The stator according to claim 12, wherein the driving member is a cylindrical protrusion.

17. The stator according to claim 12, wherein the driving member is a pair of prism shaped protrusions.

18. A method of manufacturing the piezoelectric motor that includes a rotor; a stator; and a driving member disposed on a surface of the stator and in contact with the rotor, wherein the stator includes a stator body having the surface on which the driving member is disposed, a plurality of piezoelectric elements disposed on the surface of the stator body or on another surface of the stator body opposite the surface, an electrode wiring plate having a plurality of electrodes, and a plurality of wiring lines on the electrode wiring plate, the plurality of wiring lines electrically connecting the plurality of piezoelectric elements to the plurality of electrodes, the method comprising:
   preparing a mother structure including a mother stator body in which a plurality of the stator bodies are arranged and a plurality of the piezoelectric elements are integrated with each of the stator bodies;
   obtaining individual stators by cutting the mother structure, each of the individual stators including a stator body and a plurality of piezoelectric elements of a piezoelectric motor; and
   assembling the stator and the rotor.

* * * * *